United States Patent
Afiouni

(10) Patent No.: US 6,566,424 B2
(45) Date of Patent: May 20, 2003

(54) FIRE RETARDANT CELLULOSIC MATERIALS

(75) Inventor: Ghassan F. Afiouni, Tripoli (LB)

(73) Assignee: Cool Dot, Ltd., Washington, DC (US)

( * ) Notice: Subject to any disclaimer, the term of this patent is extended or adjusted under 35 U.S.C. 154(b) by 52 days.

(21) Appl. No.: 09/737,860

(22) Filed: Dec. 18, 2000

(65) Prior Publication Data

US 2002/0111400 A1 Aug. 15, 2002

(51) Int. Cl.$^7$ ................................................ B32B 5/00
(52) U.S. Cl. ............................. 524/9; 524/13; 524/14; 428/328; 428/537.1; 106/18.16
(58) Field of Search ............................. 428/328, 537.1; 106/18.16; 524/9, 13, 14

(56) References Cited

U.S. PATENT DOCUMENTS 4,595,414 A    6/1986  Shutt ...................... 106/18.16
5,082,727 A  * 1/1992  Thijssen et al. ............ 428/323
5,721,281 A  * 2/1998  Blount ....................... 521/103
6,042,639 A    3/2000  Valsö et al. ............... 106/18.15

* cited by examiner

Primary Examiner—Cephia D. Toomer
(74) Attorney, Agent, or Firm—Dennison, Schultz & Dougherty

(57) ABSTRACT

Cellulosic materials such as wood chips, textile fibers and the like are treated to produce products such as particle board having enhanced fire and heat resistant properties. For example, wood chips are saturated with an eqimolar aqueous solution of monoammonium phosphate and diammonium phosphate. A metal hydroxide is added to the solution. The saturated wood chips are dried and mixed with a modified glue composition. The glue that which contains urea formaldehyde and/or phenolic resin is in powdered or brown marble form and dissolved in water. The treated wood chips and modified glue is then mixed, formed into a mat and placed under pressure at about 120° C. for 8 to 15 minutes. The pressure may range from about 300 to 400 psi.

11 Claims, 8 Drawing Sheets

FIRE RETARDANT CELLULOSIC MATERIALS

FIELD OF THE INVENTION

This invention relates to a fire retardant cellulosic material and more particularly to a fire retardant particle board having improved flame and heat resistance.

BACKGROUND FOR THE INVENTION

Cellulosic materials such as paper, wood, cotton and the like are commonly used for household and commercial applications. Such materials are highly flammable and when ignited the fire spreads rapidly. Nevertheless, such materials are commonly used. Accordingly, a number of methods for treating such materials to reduce their flammability have been developed. However, such methods may be inadequate for today's standards, may prove too costly for the commercial market, provide too little protection against fire and smoke and result in products with other shortcomings.

The use of cellulosic products which are treated with fire retardant materials frequently involve human beings, who incorporate such products in a confined space as for example in a home, kitchen or other room. Therefore the products must provide a safe environment and at the same time provide a pleasing appearance particularly when the products are made of particle board. Therefore the use of volatile or harmful solvents should be minimized and preferably avoided.

It is also important to eliminate volatile or harmful solvents which could cause problems during a process for treating cellulosic material with a flame retardant agent. Further, it is important that any treatment minimizes the likelihood of chemical exuding from the processed material. It is also important that any chemical treatment should not produce or release toxic substances onto the surface of a product.

Conventional methods for treating cellulosic materials such as particle board and the like typically include the application of salts of phosphoric acid, boric acid etc. Other methods use various organic solvent systems. Both of such methods may be economical, but often result in crystallization of salts on the surface of a wood product. In addition, such methods may result in migration of undesirable chemicals to the surface of products made thereby. The solvents used are often volatile during the application of the flame retardants and exude from the finished products.

It has also been recognized that ammonium phosphates are among the more effective inorganic fire retardants which are commonly used to treat cellulosic materials. Such phosphates are typically present as diammonium phosphate, monoammonium phosphate or simple or complex mixtures of such phosphates. Fire retardants of this type are prepared by reacting aqueous phosphorous acid with an alkaline oxide such as ethylene oxide.

A more recent approach to provide a non-blooming fire retardant composition is disclosed in the U.S. Pat. No. 4,539,045 of Wagner. As disclosed therein, an ammonium phosphate-containing fire retardant includes an effective amount of boric acid or alkali metal borate. The ammonium phosphate-containing fire retardant comprises a reaction mixture of aqueous phosphoric acid and an alkylene oxide. Boric acid or alkali metal borate is present in an amount of from about 2.5 to about 12 percent by weight of solids.

It is now believed that there may be a large commercial demand for an improved fire retardant cellulosic products in accordance with the present invention. It is believed that this demand extends to a fire retardant particle board which has improved heat and flame resistance. A demand for an improved fire retardant cellulosic material is further supported by the products' enhanced properties. For example, such products do not include toxic substances and produce minimal smoke when exposed to heat and/or open flame. Accordingly, there is no harmful vapor or toxic substance to deal with during the manufacturing process.

In addition, products in accordance with the present invention do not exude toxic substances during or after manufacture or when exposed to high temperatures and/or open flame. Further the chemicals incorporated do not migrate to the surfaces or result in unsightly blemishes. Finally it is believed that the products as disclosed herein can be manufactured in a cost effective manner and brought to market at a competitive price.

BRIEF SUMMARY OF THE INVENTION

In essence, the present invention contemplates a fire retardant cellulosic material and more particularly a fire retardant particle board which is made from wood chips and/or fibers. The particle board comprises from about 60 to about 75 percent by weight cellulosic material, preferably in the form of wood chips. Such chips have the same mix of particle sizes which are incorporated in the manufacture of conventional particle boards and may be in the form of wood fibers or fiber like chips. The particle board also includes from about 8 to about 12 percent by weight of a glue which is selected from the group consisting of urea formaldehyde resin, phenolic resin and mixtures thereof as well as other conventional industrial glues. In addition to the above, the particle board includes between about 6.5 and 13.6 percent by weight monoammonium phosphate and between about 7.4 and about 15.6 percent by weight diammonium phosphate. An important aspect of the invention resides in using about equal or preferably equal molar concentrations of the monoammonium phosphate and the diammonium phosphate. In addition, the particle board includes about 0.8 and about 1.6 percent by weight metal hydroxide and preferably aluminum hydroxide.

In a preferred embodimenbt of the invention the particle board contains between about 67 and about 74 percent by weight wood chips and between about 10 and about 12 weight percent of a treated urea formaldehyde resin. It also contains from about 6.5 to about 10 percent by weight monoammonium phosphate and from about 7.4 to about 11.2 percent by weight diammonium phosphate. In addition, the particle board includes between about 0.8 and about 1.15 percent by weight aluminum hydroxide.

The particle board is produced in accordance with a method as disclosed and claimed in my copending application entitled, "A Method For Producing A Flame Retardant Cellulosic Sheet Material," which was filed on even date herewith. That method incorporates an aqueous solution which is disclosed and claimed in my copending application entitled, "Fire Retardant Composition," which was filed on the same date as this application. That method also incorporates an improved or treated urea formaldehyde resin as disclosed in my copending application entitled, "A Flame Retardant Glue And Method For Making The Same," which was also filed on the same date as the present application. All of my copending applications mentioned above are incorporated herein in their entireties by reference.

The invention will now be described in connection with the accompanying drawings.

DESCRIPTION OF THE PREFERRED EMBODIMENTS OF THE INVENTION

The widespread use of cellulosic particle board and increased concern for safety has led to a demand for an improved flame retardant fiber board. For the purpose of the present invention, the term cellulosic particle board encompasses boards such as hard boards, particle board, fiber board, medium density fiber board (MDF), oriented strand board, card board and other pulp products which are made of cellulosic material. Such boards are made from cellulosic materials selected from a group consisting of wood fibers, sawdust, wood particles or chips, bagasse and cellulosic fibers to include pulp, pulp extracts and paper of all grades.

As contemplated by the present invention, wood chips or fibers of the type used in manufacturing conventional fiber board may be used in producing an improved particle board as disclosed herein.

The first step in manufacturing a cellulosic particle board with enhanced flame and heat retarding characteristics requires the use of a fire retardant solution as defined hereinafter.

Fire Retardant Solutions

In general the fire retardant composition or solution as disclosed herein comprises an aqueous solution for use in impregnating cellulosic materials and textile fibers. The solution contains monoammonium phosphate and diammonium phosphate in equal molar amounts. For example the molar amounts of monoammonium phosphate and diammonium phosphate range from about 0.3 moles per liter to about 0.95 moles per liter or until maximum dissolution of both chemicals and preferably between about 0.35 moles per liter and 0.55 moles per liter. A metal hydroxide, aluminum, calcium or magnesium and preferably an aluminum hydroxide is added to the solution in an amount of between about 3.75 and about 11.87 grams per liter.

In the preferred solutions, the molar concentrations of the monoammonium phosphate (MAP) and diammonium phosphate (DAP) are equal and within the range of 0.35 and 0.55 moles per liter. Examples of compositions for use in the manufacture of cellulosic particle board and treatment of textile fibers are given in the following table. In addition to the examples shown, tests were conducted on sample compositions wherein the aluminum hydroxide was replaced with an equal amount of calcium hydroxide and also with an equal amount of magnesium hydroxide. Tests on those compositions were comparable to those obtained with aluminum hydroxide.

TABLE 1

| Moles | MAP in Grams | DAP in Grams | Al (OH) 3 |
| --- | --- | --- | --- |
| 0.3 | 34.5 | 39.6 | 3.75 |
| 0.35 | 40.25 | 46.2 | 4.375 |
| 0.4 | 46 | 52.8 | 5 |
| 0.45 | 51.75 | 59.4 | 5.625 |
| 0.5 | 57.5 | 66 | 6.25 |
| 0.55 | 63.25 | 72.6 | 6.875 |
| 0.6 | 69 | 79.2 | 7.5 |
| 0.65 | 74.75 | 85.8 | 8.125 |
| 0.7 | 80.5 | 92.4 | 8.75 |
| 0.75 | 86.25 | 99 | 9.375 |
| 0.8 | 92 | 105.6 | 10 |
| 0.85 | 97.75 | 112.2 | 10.625 |
| 0.9 | 103.5 | 118.8 | 11.25 |
| 0.95 | 109.25 | 125.4 | 11.875 |

Figure 1:
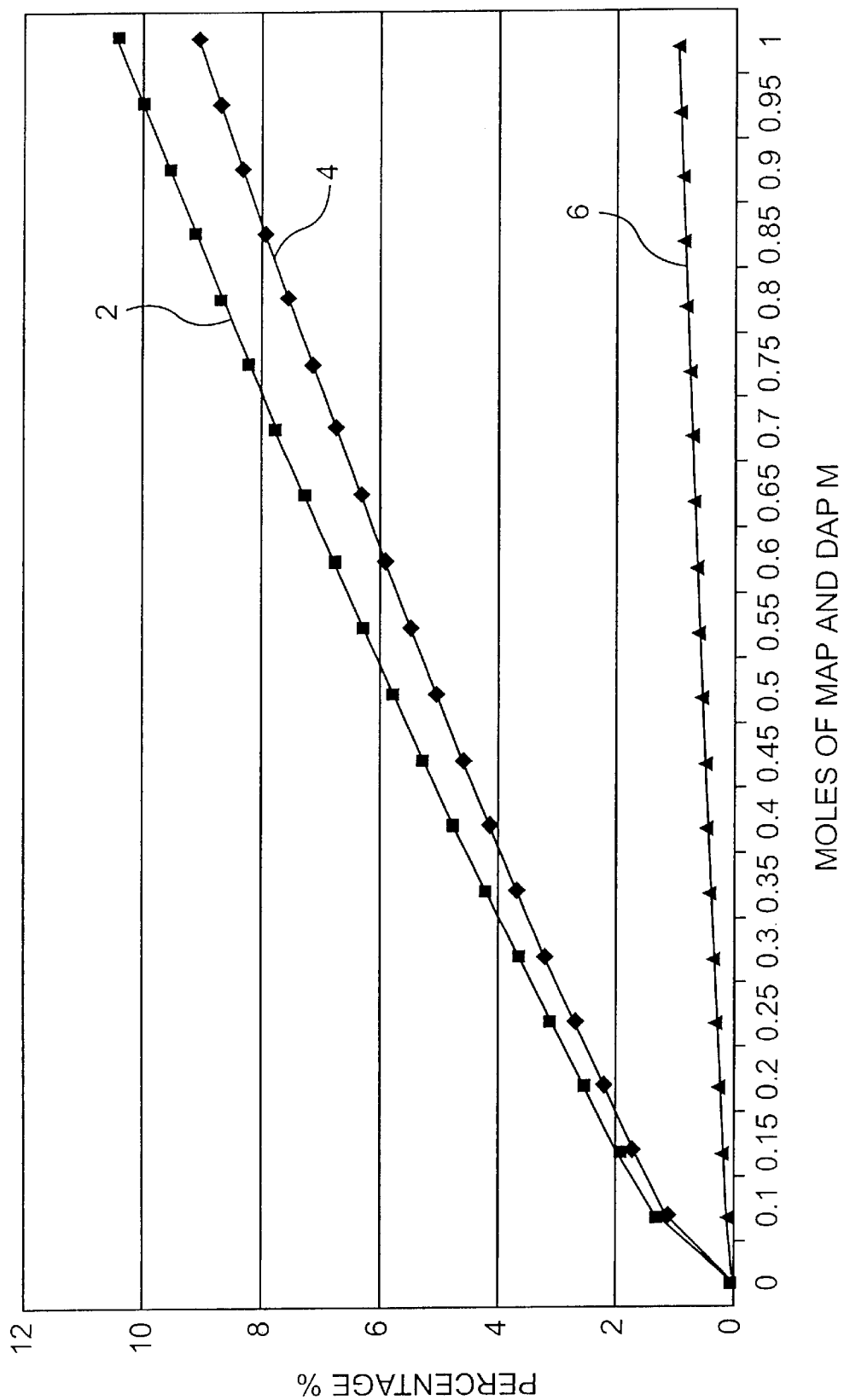
FIG. 1 is a graphical representation showing the composition of a fire retardant composition or solution as used in the production of flame retardant particle boards in accordance with the present invention.

The various compositions are also shown in FIG. 1 wherein the concentration of diammonium phosphate and monoammonium phosphate in percent by weight versus molar concentrations are shown. The curve 2 shows the content of the diammonium phosphate in percent by weight while the curve 4 shows the content of the monoammonium phosphate. A curve 6 illustrates the content of aluminum hydroxide which is added to the solution.

Figure 2:
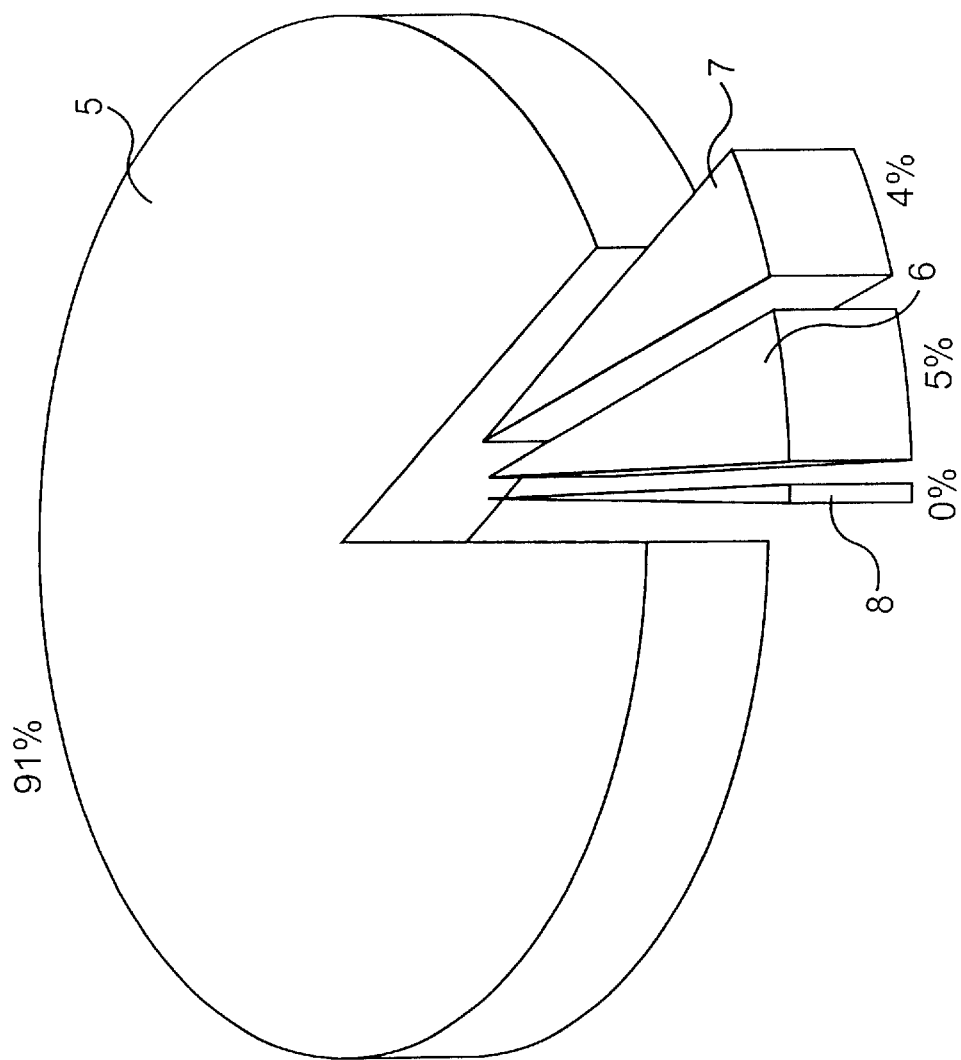
FIG. 2 is a pie chart illustrating the compositions of one preferred solution from FIG. 3.

A representative example of a solution is shown in FIG. 2 by a pie chart which illustrates the percent by weight of each of the ingredients. For example the solution shown in FIG. 2 contains about 91 percent water as indicated by 5, five percent diammonium phosphate 6, four percent monoammonium phosphate 7 and less than one percent aluminum hydroxide as indicated by the numeral 8. A process for making the solution of Table 1 will be described hereinafter in connection with FIG. 4a.

In the manufacture of a particle board as disclosed herein, one liter of one of the above-identified solutions is added to about 500 grams of dry wood chips. The dry wood chips should have a moisture content of about 15 percent of less. The mixture of the wood chips and solution is thoroughly mixed until the wood is completely saturated. For example, the mixture may be stirred with a conventional mixer with shaft or rotating mixer with shaft of the type used with a five-gallon container at medium speed. The mixture is stirred for about 10 to 15 minutes and until the mix reaches a uniform dark brown color. The stirring may be continued for about one minute after displaying the uniform dark color to assure complete saturation.

The saturated wood chips are then dried to a uniform light brown or tan color at a temperature of between about 100 to 120° C. for about 45 minutes to about 70 minutes with some stirring. At this stage the wood chips will have a moisture content of about 15 percent. These treated wood chips or dried saturated wood chips are then mixed with a modified glue composition as will be described below.

Modified Glue Composition

The fire retardant cellulosic materials disclosed herein also include a modified glue composition. That composition is made from a urea formaldehyde resin, phenolic resin or mixtures thereof in the form of a dry powder. Preferred glues include conventional particle board glues such as Kaltliem Type h and Kaurit. In preparing a modified glue composition, about 75 grams of a urea formaldehyde powdered glue are added to about 100 milliliters of water and thoroughly mixed or stirred at about 30–50° C. If a phenolic resin is used the glue water MAP/DAP solution is mixed at about 60° C. The glue, which may be in a brown marble form, is mixed or stirred until all of the glue is dissolved to form an emulsion. Then, about 4 grams of monoammonium phosphate and about 4 grams of diammonium phosphate are dissolved in about 25 milliliters of water in a separate beaker. An additional one gram of aluminum hydroxide may also be added. This ensures that essentially all of the MAP/DAP dissolves in the water. The metal hydroxide may dissolve slightly but most will be undissolved but suspended in the glue water solution.

All of the glue water solution is mixed with about 25 milliliters of the water, monoammonium phosphate, diammonium phosphate mix to thereby form the modified glue composition. The monoammonium phosphate and diammonium phosphate are present in about equal if not equal molar concentrations.

In a second example of a modified glue composition, about 68 grams of powdered glue is dissolved in about 100 milliliters of water. Then between about 3.6 to about 4.4 grams of monoammonium phosphate and about 3.6 to about 4.4 grams of diammonium phosphate is mixed in a separate beaker with about 25 milliters of water to thereby form a modified glue composition by mixing both solutions in the manner shown in the flow chart FIG. 4b.

Figure 3:
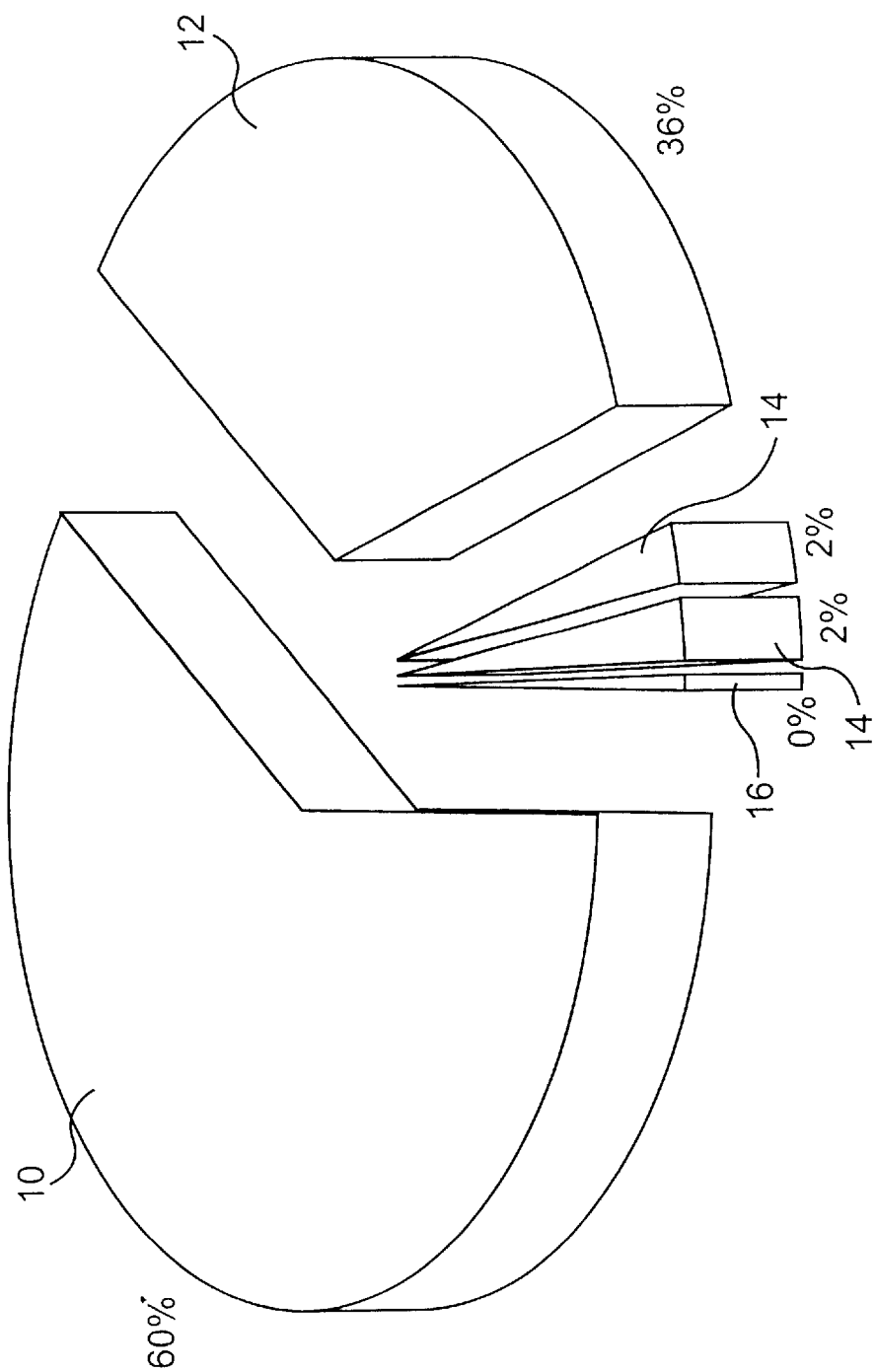
FIG. 3 is a pie chart illustrating a preferred glue composition as used in the production of a fire retardant particle board in accordance with the present invention.

One preferred glue composition is illustrated in FIG. 3. As shown therein, the glue composition includes about 60 percent by weight water as indicated by the wedge 10, about 36 percent by weight area formaldehyde resin 12, about 2 percent by weight monoammonium phosphate 14 and about 2 percent by weight diammonium phosphate. As indicated the glue composition contains between about 0%–10% by weight aluminum hydroxide 16. In some compositions this aluminum hydroxide is totally eliminated.

In a further example of a modified glue composition, about 82 grams of powdered glue is dissolved in about 100 milliliters of water. This initial solution is then mixed with a monoammonium phosphate, diammonium phosphate solution in the same manner and amounts as set forth in the aforementioned second example.

A number of other glue compositions were made using phenol formaldehyde. Each of those compositions were made by warming about 200 milliters of water to about 60° C. Then about 40, 60, 80, 100 and 120 grams of the powdered glue were each dissolved in about 200 milliters of warmed water with mixing. In a separate beaker about 6 grams of monoammonium phosphate and about 6 grams of diammonium phosphate were dissolved in water and the resulting solution added to each of the powdered glue water solutions mentioned above. Additional experiments were conducted using increments of 8, 10, 12, 14 and 16 grams each of monoammonium phosphate and diammonium phosphate. Each of the treated or modified glues had improved flame retardant properties.

Method For Making Fire Retardant Materials

A method for making cellulosic sheet material, as for example particle board, with enhance resistance to fire, flame and heat will be described in connection with FIGS. 4a–4c. As illustrated in FIG. 4c, the method includes the step 20 of providing a mass of wood chips or fibers having a moisture content of 15 percent or less. The particle size of the wood chips may vary widely, but are preferably in the same range of particle sizes as used in manufacturing conventional particle board. Separation of small particles from larger ones may be done to make a conventional sandwich particle board.

Figure 4A:
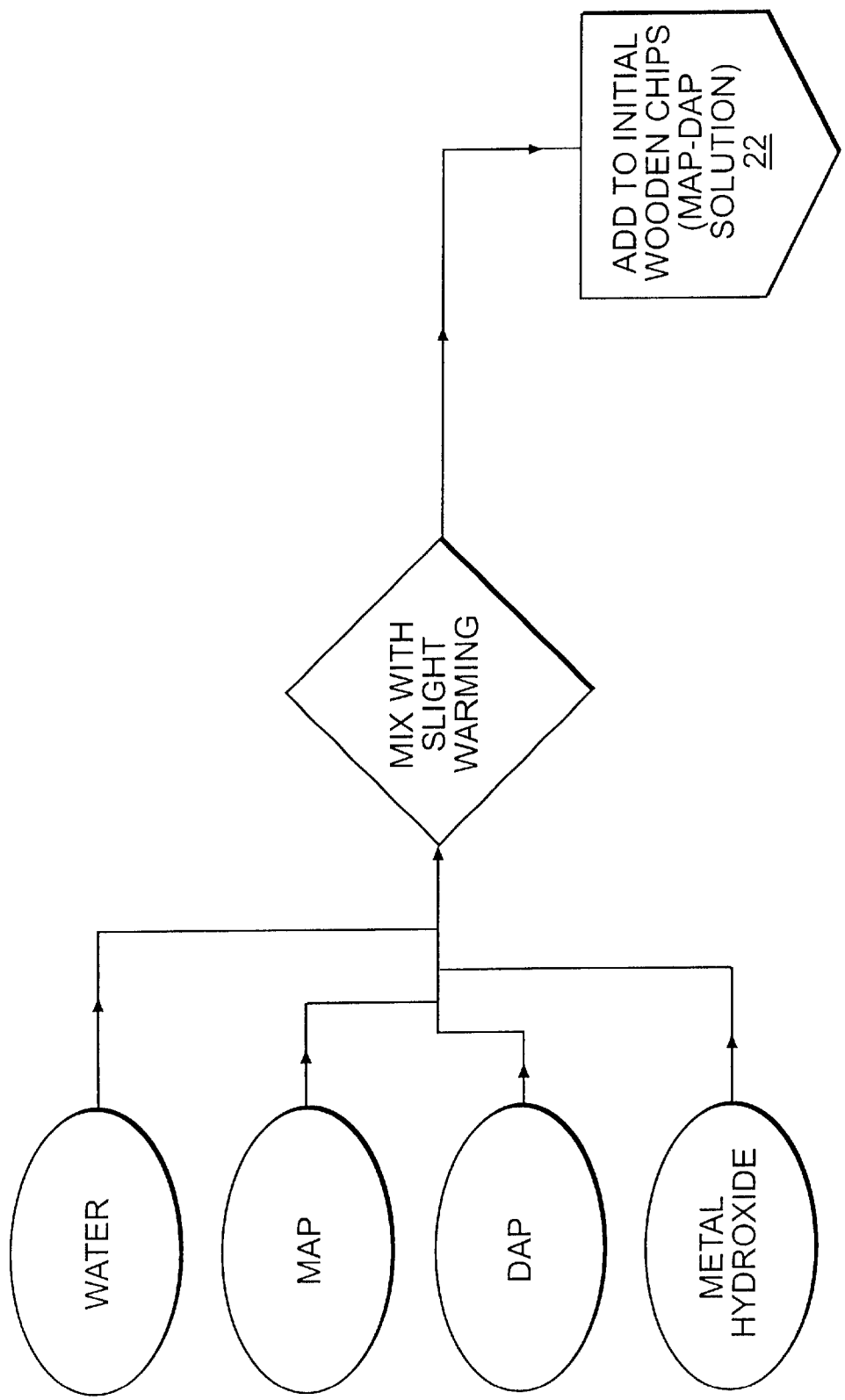
FIGS. 4a, b, c are flowcharts illustrating the process steps for imparting improved flame and/or fire retardancy to particle board or the like in accordance with the present invention.

The method also includes the step 22 of providing an aqueous solution of monoammonium phosphate (MAP) and diammonium phosphate (DAP) wherein the MAP and DAP are present in equal molar lower concentrations as for example from FIG. 4a. Such solutions which include a small amount of aluminum hydroxide are described above in the section of this specification identified as Fire Retardant Solutions. For example, about one liter of one of these solutions of Table 1 is added to between about 450 to 550 grams and preferably about 500 grams of dried wood chips in step 24.

In step 26, the wood chips are saturated with the solution from step 22. This saturation is accomplished by mixing or stirring the wood chips and solution for about 10 to 15 minutes at a temperature within the range of about 20 to 25° C. When the wood chips are thoroughly saturated, the mix will take on a uniform dark brown color. This color change is relatively slow and usually takes place over a period of about several minutes, i.e. after mixing for approximately 10–20 minutes depending on the mixer efficiency.

The saturated wood chips from step 26 are then dried in a conventional manner in step 28. This drying will normally be conducted at a temperature slightly higher than 100° C. (105°–110°) using care to ensure that only the water evaporates. The drying is continued until the dried saturated wood chips have a moisture content of about 15 percent or less. The drying step was accomplished in about 40–75 minutes depending on the relative humidity from temperature. At this point, the treated wood chips referred to herein from time to time as dried saturated cellulosic material will have a light tan color. Drying can also be done using a microwave oven set at low to medium power or by other conventional means. Using a microwave oven requires opening the oven and stirring every 2 to 3 minutes.

Figure 4B:
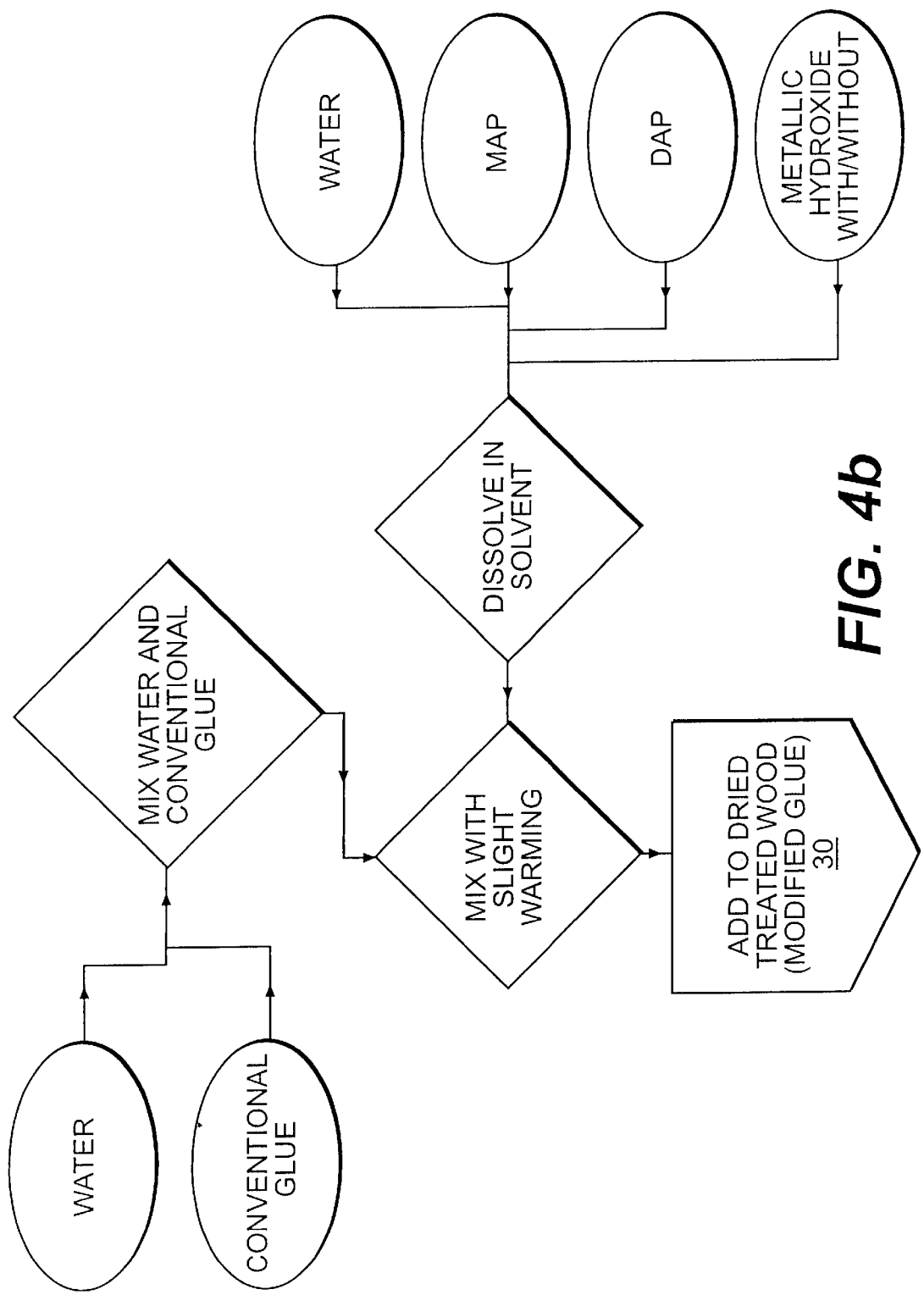
Figure 4C:
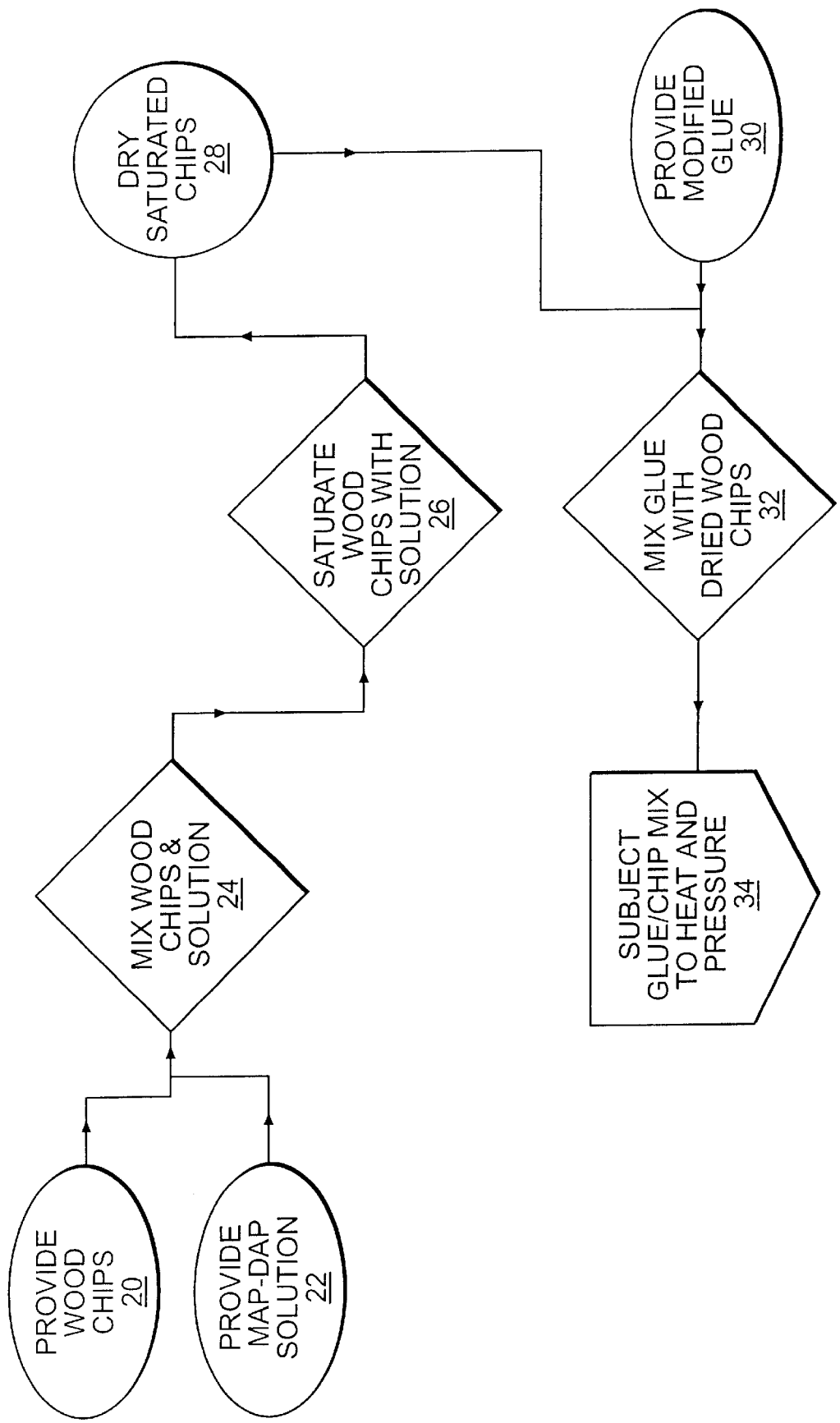

The method disclosed herein also includes a step 30 of providing a modified glue composition as described above in the section identified as Modified Glue Composition, continued from FIG. 4b. In that step a urea formaldehyde powdered glue such as one available from BASF and identified as Kaltliem Type H is dissolved in water. This treated or modified glue composition contains between about 54 to about 66 percent by weight water, between about 33 to about 39 percent by weight glue and between about 1.5 and about 2.5 weight percent MAP and about the same amount of DAP. A small amount of aluminum hydroxide, about one percent or more by weight may be added.

In step 32 the modified glue composition is mixed with about 500 grams of the dried saturated wood chips, i.e. the wood chips that were saturated with the solution in step 26 and dried in step 28. This mass of wood chips and modified glue form a mass or mat of treated wood chips. This mass or mat is then place on a conventional platen and subjected to heat and pressure in the same manner, temperature and pressures as used in manufacturing conventional particle board. For example the mat of particles may be subjected to a pressure of about 350 to 400 psi at a temperature of about 110–195° C. and preferably above 120° C.

At times a finished particle board made in accordance with the methods disclosed herein may have a thin white film on the surface of the board. This film may be readily removed by wiping with a damp cloth that is either slightly basic or slightly acidic as for example with sodium or potassium hydroxide or hydrochloric or sulfuric acid, respectively.

It is also contemplated that a thin laminate as for example with a surface finish such as wood grain may also be added to the particle board in accordance with the present invention. In such application the laminate is dipped in a solution as disclosed herein, dried and glued to the surface of the particle board with a treated glue composition as disclosed herein.

Particle Board Composition

The cellulosic sheet material or particle board composition as disclosed herein contains between about 60 to about 75 percent by weight wood chips, from about 8 to about 12 percent by weight of a modified glue as described above, between about 6.6 to about 13.6 percent by weight monoammonium phosphate and between about 7.4 and about 15.6 percent by weight diammonium phosphate. The particle board also contains between 0.8 and 1.6 percent by weight aluminum, calcium or magnesium hydroxide. In the composition disclosed herein, the molar concentration of the monoammonium phosphate and diammonium phosphate are about equal and preferably equal. Examples of particle board compositions having enhanced resistance to fire, flame and heat are given in the following Table 2.

TABLE 2

| % MAP | % DAP | % Al | % Wood Chips |
|---|---|---|---|
| 5.817028 | 6.587595 | 0.717685 | 75.54581854 |
| 6.557256 | 7.438966 | 0.796503 | 74.09328344 |
| 7.269555 | 8.258215 | 0.872347 | 72.69555103 |
| 7.955478 | 9.047126 | 0.945382 | 71.34957725 |
| 8.616462 | 9.807356 | 1.015762 | 70.0525394 |
| 9.253844 | 10.54044 | 1.083629 | 68.80181637 |
| 9.868866 | 11.2478 | 1.149115 | 67.59497093 |
| 10.46268 | 11.93078 | 1.212343 | 66.42973395 |
| 11.03637 | 12.59061 | 1.273428 | 65.30399007 |
| 11.59095 | 13.22845 | 1.332477 | 64.21576497 |
| 12.12734 | 13.84538 | 1.389591 | 63.16321374 |
| 12.64643 | 14.44241 | 1.444862 | 62.14461051 |
| 13.14904 | 15.02049 | 1.498379 | 61.15833894 |
| 13.63595 | 15.58051 | 1.550224 | 60.20288372 |

Figure 5:
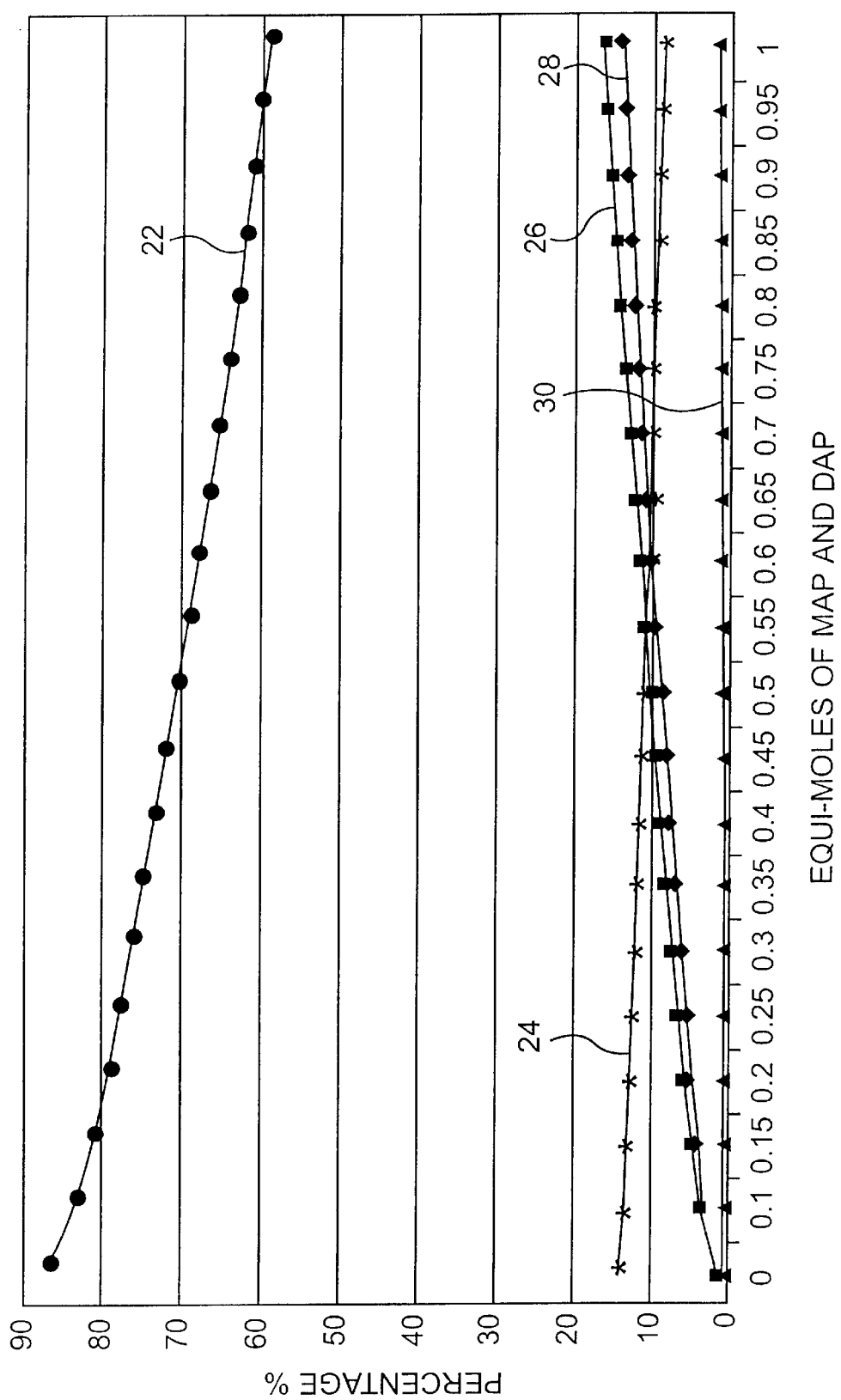
FIG. 5 is graphical representation of the final composition of a fire retardant particle board which was made in accordance with the present invention and shows the composition in weight percent at various molar concentrations of monoammonium phosphate and diammonium phosphate.

The composition of the particle boards in accordance with the preferred embodiments of the invention are illustrated by FIG. 5. As shown therein, the curve 22 indicates the percent by weight wood chips while the curve 24 indicates the percent by weight glue. The weight percent of DAP and MAP are illustrated by the curve 26 and 28 respectively. Finally, the curve 30 illustrates the percent by weight aluminum hydroxide.

Figure 6:
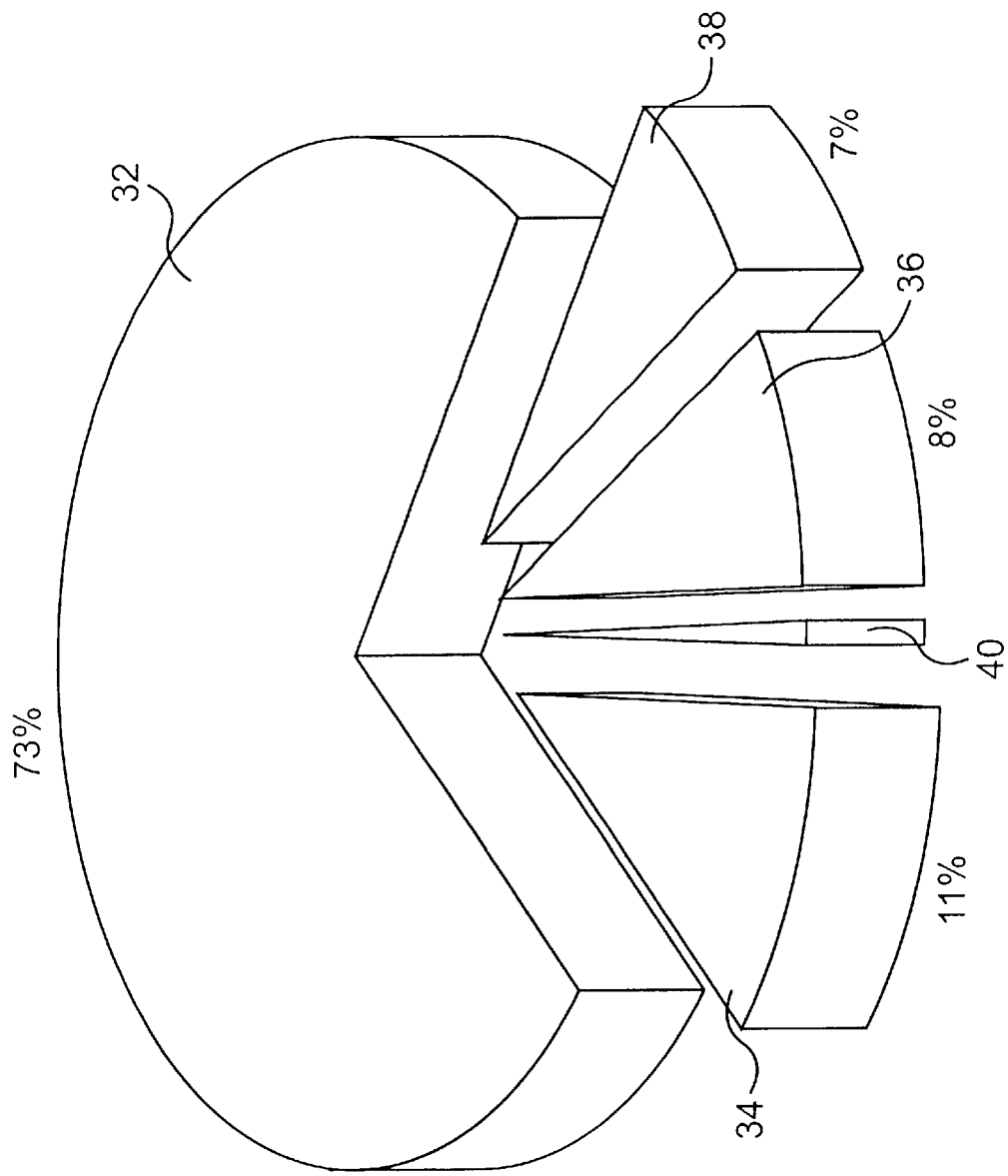
FIG. 6 is a pie chart illustrating the preferred composition of a fire retardant particle board from FIG. 1 at 0.4M MAP/DAP.

One preferred embodiment of the invention is illustrated by a pie chart in FIG. 6. As indicated therein the particle board contains about 73 percent by weight wood is shown by the wedge 32 and about 11 percent by weight includes powdered glue as indicated by the numbers 34. About 8 percent by weight DAP and 7 percent by weight MAP are indicated by the segments 36 and 38 respectively. Finally the numeral 40 shows that 1 percent by weight aluminum hydroxide in the final composition.

While the invention has been described in connection with its preferred embodiments, it should be recognized that changes and modifications may be made therein without departing from the scope of the appended claims.

What is claimed is:

1. a fire retardant particle board comprising from about 60 to about 75 percent by weight cellulosic material, from about 8 to about 12 percent by weight glue selected from the group consisting of phenolic resin and urea formaldehyde resin and mixtures thereof, between about 6.5 and about 13.6 percent by weight monoammonium phosphate, between about 7.4 and about 15.6 percent by weight diammonium phosphate and between about 0.8 and about 1.6 percent by weight metal hydroxide an wherein the molar concentration of said monoammonium phosphate and said diammonium phosphate are about equal.

2. A fire retardant particle board according to claim 1, in which said glue is a powdered urea formaldehyde resin.

3. A fire retardant particle board according to claim 2, in which said particle board comprises a mass of wood fibers.

4. A fire retardant particle board according to claim 2, in which said cellulosic material comprises a mass of wood chips.

5. A fire retardant particle board according to claim 4, which includes from about 67 to about 74 percent by weight wood chips, between about 10 to about 12 percent by weight urea formaldehyde resin, from about 6.5 to about 10 percent by weight monoammonium phosphate and from about 7.5 to about 11.2 percent by weight diammonium phosphate and between about 0.8 and about 1.15 percent by weight aluminum hydroxide.

6. A fire retardant particle board according to claim 5, which includes about 73 percent by weight wood chips, about 10.5 percent by weight urea formaldehyde glue, about 7.3 percent by weight monoammonium phosphate, about 8.3 percent by weight diammonium phosphate and about 0.9 percent by weight aluminum hydroxide.

7. A fire retardant particle board according to claim 5, which includes about 71 percent by weight wood chips, about 10 percent by weight urea formaldehyde glue, about 8 percent by weight monoammonium phosphate and about 9 percent by weight diammonium phosphate.

8. A fire retardant particle board according to claim 5, which includes about 70 percent by weight wood chips, about 10 percent by weight urea formaldehyde resin, about 9 percent by weight monoammonium phosphate, about 10 percent by weight diammonium phosphate and about 1.0 percent by weight aluminum hydroxide.

9. A fire retardant particle board according to claim 5, which includes about 69 percent by weight wood chips, about 10 percent by weight urea formaldehyde glue, about 9 percent by weight monoammonium phosphate, about 11 percent by weight diammonium phosphate and about 1 percent by weight aluminum hydroxide.

10. A fire retardant particle board according to claim 5, which includes about 68 percent by weight wood chips, about 8.9 percent by weight urea formaldehyde resin, about 10 percent by weight monoammonium phosphate, about 11 percent by weight diammonium phosphate and about 1.1 percent by weight aluminum hydroxide.

11. A fire retardant particle board according to claim 1 in which said glue is phenol formaldehyde.

\* \* \* \* \*